(12) United States Patent
Schmidt et al.

(10) Patent No.: US 6,655,041 B1
(45) Date of Patent: Dec. 2, 2003

(54) MULTILEVEL ROLLER-CONVEYOR DRYER

(75) Inventors: Manfred Schmidt, Oberaula-Olberode (DE); Gerhard Lehn, Ludwigsau-Friedlos (DE); Bernd Schneider, Bad Hersfeld (DE)

(73) Assignee: Babcock-BSH GmbH, Bad Hersfeld (DE)

( * ) Notice: Subject to any disclaimer, the term of this patent is extended or adjusted under 35 U.S.C. 154(b) by 0 days.

(21) Appl. No.: 10/129,250

(22) PCT Filed: Aug. 19, 2000

(86) PCT No.: PCT/EP00/08115

§ 371 (c)(1),
(2), (4) Date: Apr. 30, 2002

(87) PCT Pub. No.: WO01/36890

PCT Pub. Date: May 25, 2001

(30) Foreign Application Priority Data

Nov. 17, 1999 (DE) .......................................... 199 55 147

(51) Int. Cl.[7] .............................................. F26B 23/00
(52) U.S. Cl. .............................. 34/218; 34/105; 34/203; 34/207; 34/236
(58) Field of Search .......................... 34/218, 105, 203, 34/225, 207, 236, 239, 240

(56) References Cited

U.S. PATENT DOCUMENTS

| 4,024,949 A | * | 5/1977 | Kleysteuber et al. | |
| 4,142,304 A | * | 3/1979 | Ricci et al. | 34/105 |
| 4,341,335 A | * | 7/1982 | Schmid | 226/195 |
| 4,564,380 A | * | 1/1986 | Fecik et al. | 65/163 |
| 4,601,743 A | | 7/1986 | Canfield | |
| 4,798,278 A | * | 1/1989 | Cornacchia | 198/399 |
| 4,997,022 A | * | 3/1991 | Klein | 160/265 |
| 5,529,081 A | * | 6/1996 | Kappler | 134/64 R |
| 5,659,975 A | | 8/1997 | Bahner et al. | |
| 5,934,862 A | * | 8/1999 | Brown et al. | 414/528 |
| 6,055,741 A | * | 5/2000 | Ledermann et al. | 34/219 |

FOREIGN PATENT DOCUMENTS

| DE | 2 117 303 | 2/1973 |
| DE | 43 26 877 | 10/1994 |
| GB | 16712 | of 1913 |

* cited by examiner

Primary Examiner—Ira S. Lazarus
Assistant Examiner—Camtu Nguyen
(74) Attorney, Agent, or Firm—Herbert Dubno; Andrew Wilford

(57) ABSTRACT

The invention relates to a roller belt drier. The drying of panel-shaped products often requires the drier to have considerable construction lengths in order to achieve a high capacity. Long roller belt dryers, which are usually equipped with chain drives and a motor for each chain, present the problem that very strong chains are required to transmit the necessary driving forces. When the drier reaches a certain length, it is no longer possible to provide chains that are able to accommodate these forces. According to known solutions, a chain is divided and the drives are located in the centre of the drier. This causes problem s in terms of sealing the drier, as well as extra expense for the driving and tension station. The aim of the invention is to create a drier which has a driving and tension system that is structurally simple and economical even for considerable construction lengths. A chain is equipped with two drives (15, 23), the second drive (23) being integrated in a tension device (24). The invention is suitable for drying panel-shaped goods, especially plaster boards or plaster fibre boards.

7 Claims, 8 Drawing Sheets

MULTILEVEL ROLLER-CONVEYOR DRYER

CROSS REFERENCE TO RELATED APPLICATIONS

This application is the US national phase of PCT application PCT/EP00/08115 filed Aug. 19, 2000 with a claim to the priority of German patent application 19955147.2 itself filed Nov. 17, 1999.

FIELD OF THE INVENTION

The present invention relates to a dryer having devices for blowing in a drying medium, conveyors arranged in levels and each formed as a roller conveyor, a drive system comprised of a plurality of endless chains each associated with at least one drive and a tensioning device.

BACKGROUND OF THE INVENTION

Such a dryer is used for drying plate-like goods, in particular gypsum panels (see German patent document 4,326,877). It has several transport systems with vertically superposed roller conveyors, preferably in 6 to 14 levels. The rollers or each roller conveyor are driven by a motor and an endless chain. The chain can also be set up so that two roller conveyors are driven by one chain and its motor. The motor is at one end of the dryer while the opposite end is provided with a reversing and tensioning device for the chain.

The material is fed by an input device to the various levels, the dryer holding a number of panels closely juxtaposed and filling the usable width. The material is thus transported longitudinally along the conveyor through the dryer. Meanwhile a drying medium is directed at the upper surfaces of the panels.

A dryer is formed as a closed box with several sections. The number of sections is determined by the amount of drying and can be between 5 and 80. The capacity of the dryer is mainly limited by the tension that can be exerted by the belts the length of the dryer. The chain cannot be made of any possible strength, because the chain weight itself limits the chain tension. In addition a heavy-duty chain takes up substantial room and is expensive. Standard chains cannot be used beyond a certain dryer length.

Another system is known wherein for each pair of roller conveyors there are two drives. The chain is thus subdivided in the middle of the conveyor, that is instead of one chain for one conveyor or pair of conveyors, each chain having a drive that is arranged in the middle of the dryer and that has its own tensioning device. This system has the disadvantage that the drive system is expensive because it is necessary to duplicate the equipment. Furthermore sealing around the centrally mounted arrangement of the drives is difficult.

OBJECT OF THE INVENTION

It is an object of the invention to make a dryer of the described type that has a large capacity and wherein a drive system of simple construction is used and where the drive is not exposed to high temperatures and the system is easy to seal.

SUMMARY OF THE INVENTION

The object is achieved in that each chain is connected to two drives of which one is at an output end and the other is at an input end. Since for each chain there is at both the input end and output end of the dryer a respective drive, the maximum tension that the chain is subjected to is roughly halved. In this manner either the chain can be made lighter or with the same chain the dryer length and capacity can be increased without having to make a more expensive drive system. The drives and tensioning systems can be arranged outside upstream and downstream ends of the dryer so that sealing is not a problem and they are only exposed to the surrounding environmental temperature.

Driving two roller conveyors with a single chain decreases the construction costs.

The location of a tensioning device in a reversing roller ensures free movability in the longitudinal direction with solid assuming of all applied forces.

Since two roller units are set parallel to each other, the individual units can be made smaller which has a particularly positive effect on the overall construction height.

The pendent mounting of the tensioning device reduces fouling and servicing.

BRIEF DESCRIPTION OF THE DRAWING

An embodiment of the invention is more closely described with reference to the schematic drawings in which:

As shown in FIG. 1 a dryer 1 is formed of a plurality of sections 2. In order to convey panels to the dryer 1 and to distribute them to the individual levels there is a feeder 45 and for carrying them off there is an unloader 46, e.g. a roller conveyor or belt conveyor.

For each section 2 with transversely ventilated dryers 1 there is a heater 47 for blowing in and sucking out the drying medium. With longitudinally ventilated dryers 1 this heater 47 is connected to at least one blowing section and one venting section so that the drying medium flows longitudinally through the remaining sections 2.

Figure 2:
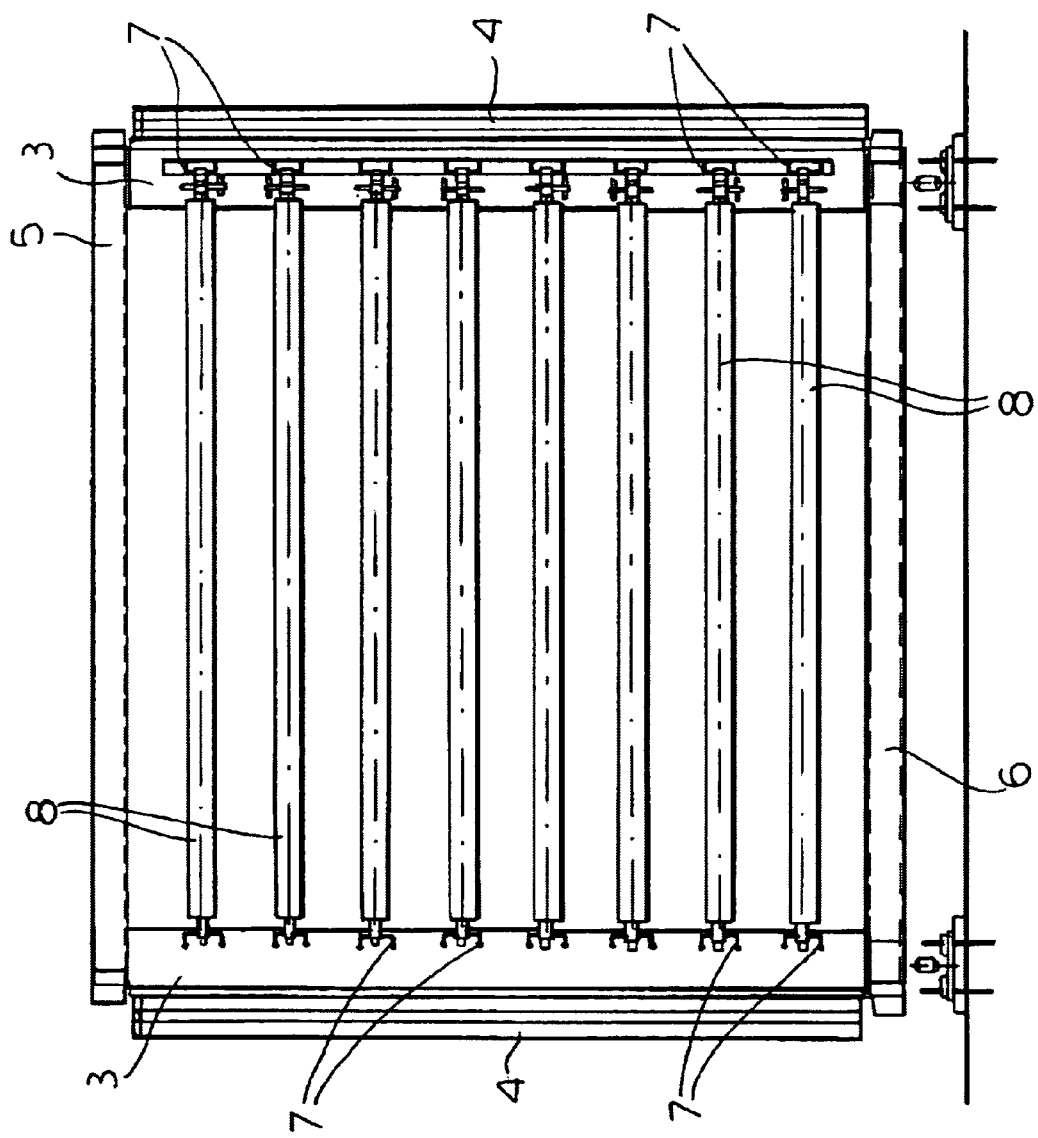
FIG. 2 is a cross section through the dryer of FIG. 1.
Figure 3:
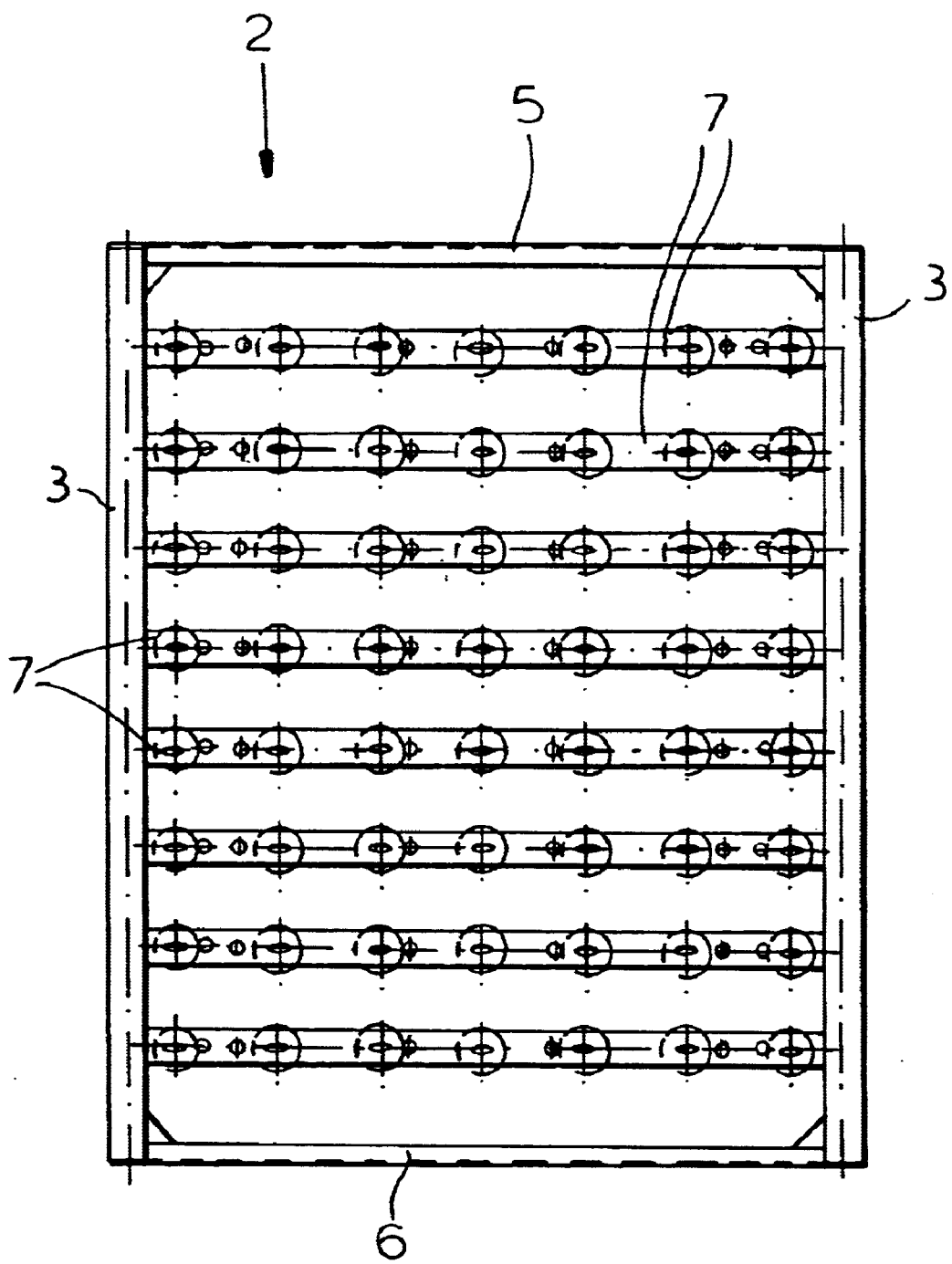
FIG. 3 shows a longitudinal section through a section of the dryer from the drive side.

Each section 2 has a rectangular footprint and is more closely described with reference to FIGS. 2 and 3. Each corner has a post 3. Each section has two side walls 4, a ceiling 5, and a floor 6 to which the posts 3 are fixed. The side walls 4, ceiling 5, and floor 6 are double-walled with insulation between the walls. On each side of the dryer 1 extending between the two respective posts 3 are horizontally extending and vertically spaced roller support beams 7 fixed to the posts 3 and corresponding to the levels of the dryer 1. Between the beams 7 at each level extends a plurality of cylindrical rollers 8 forming a roller array. Each of the vertically spaced roller arrays forms the floor of the respective level in which the panels are transported; they therefore constitute roller conveyors.

Figure 1:
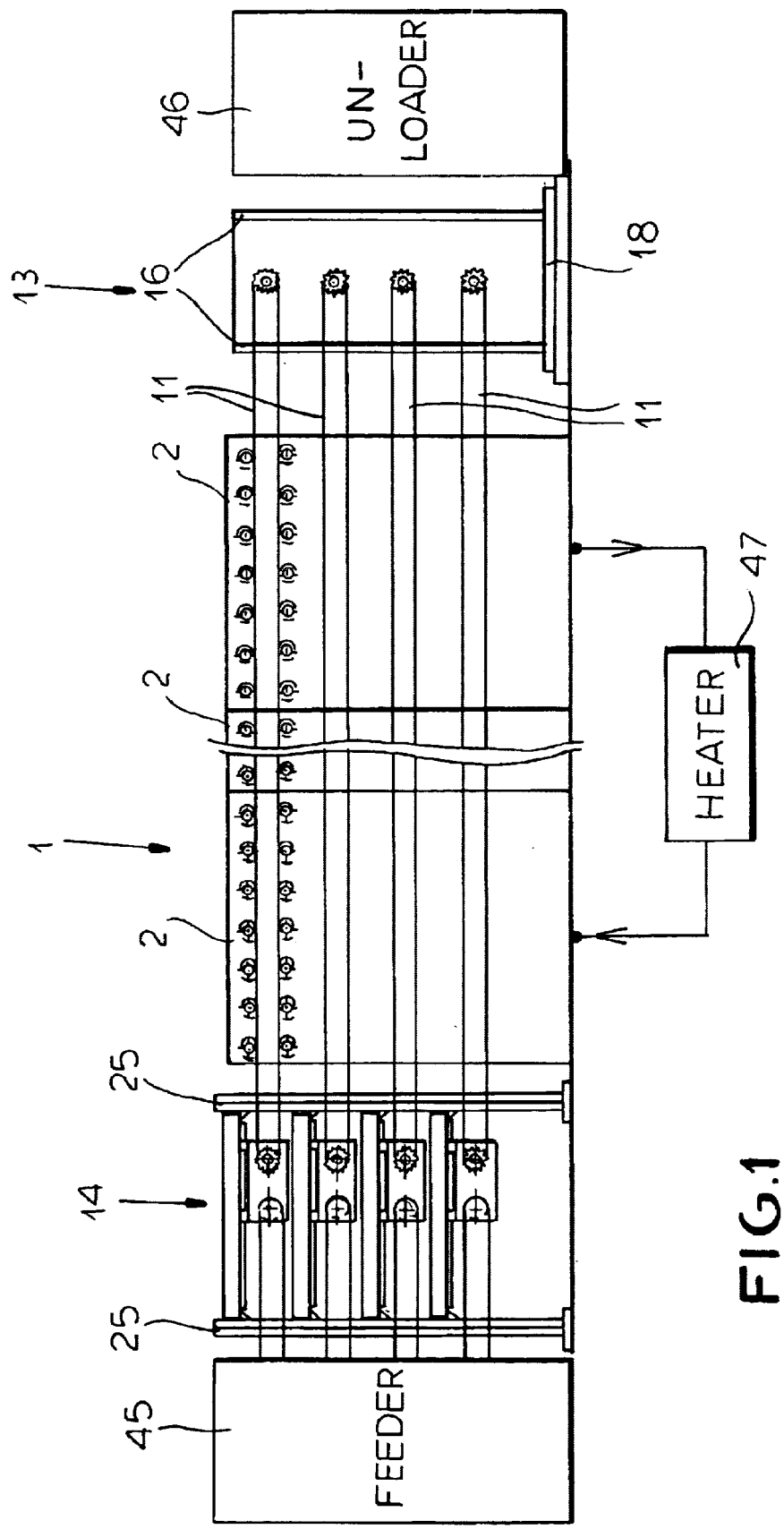
FIG. 1 shows a multisection dryer seen from the drive side.
Figure 4:
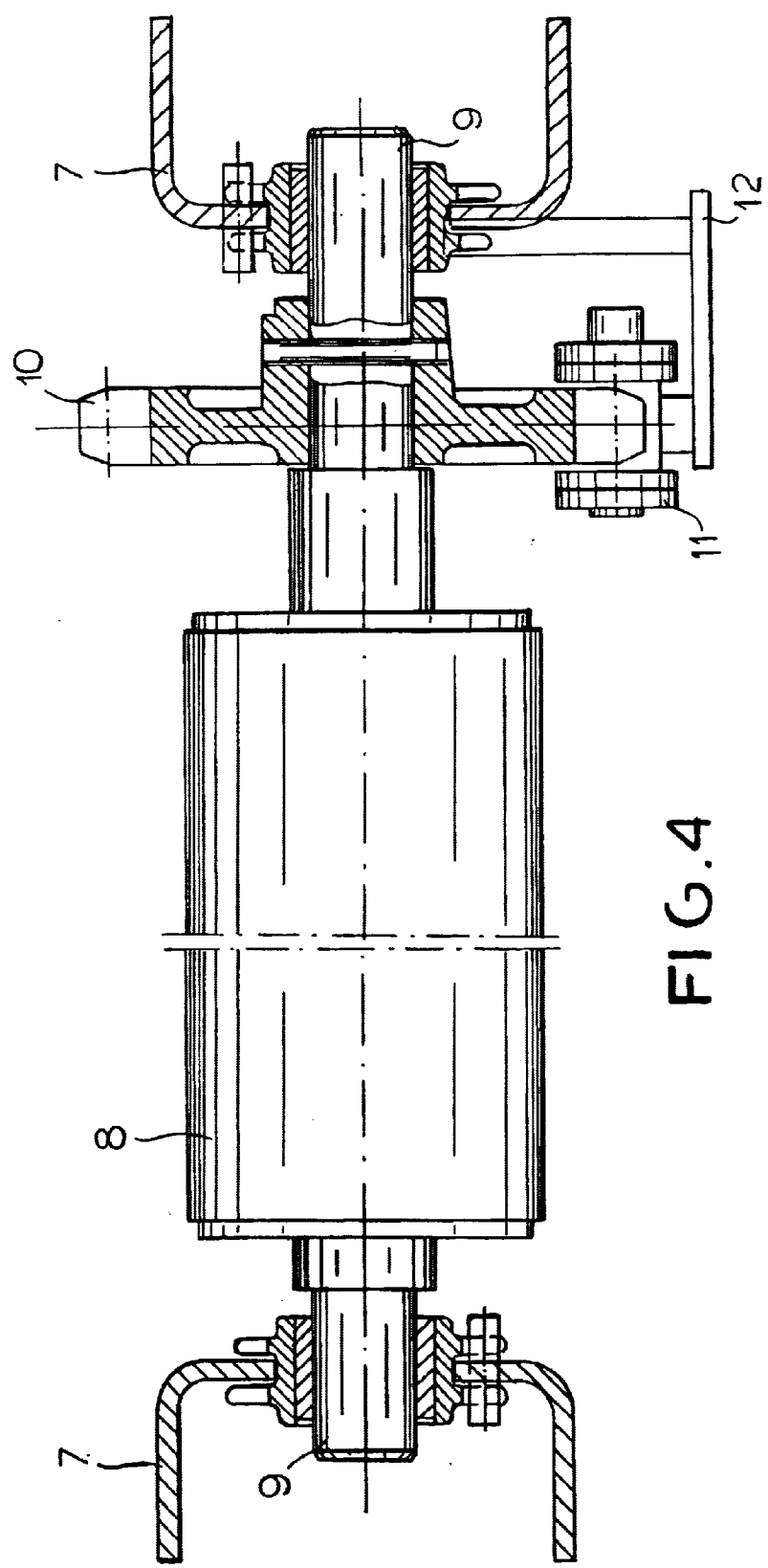
FIG. 4 shows the support of a roller in detail.

As visible in FIG. 4 the rollers 8 are provided on their ends with stub shafts 9 which are rotatably mounted in the respective roller beams 7. On the drive side inside the respective roller beam 7 there is a sprocket 10 on each shaft 9. An endless chain 11 is engaged with the sprockets 10 of two immediately vertically adjacent rollers 8. To this end as shown in FIG. 1 the chain 11 is above the sprocket 10 of the respective lower level and below the sprocket 10 of the respective upper level, the chain 11 for example running on a fixed plate 12 forming a guide rail. The chains 11 extend the entire length of the dryer 1 and therebeyond to frames 13 and 14.

Figure 5:
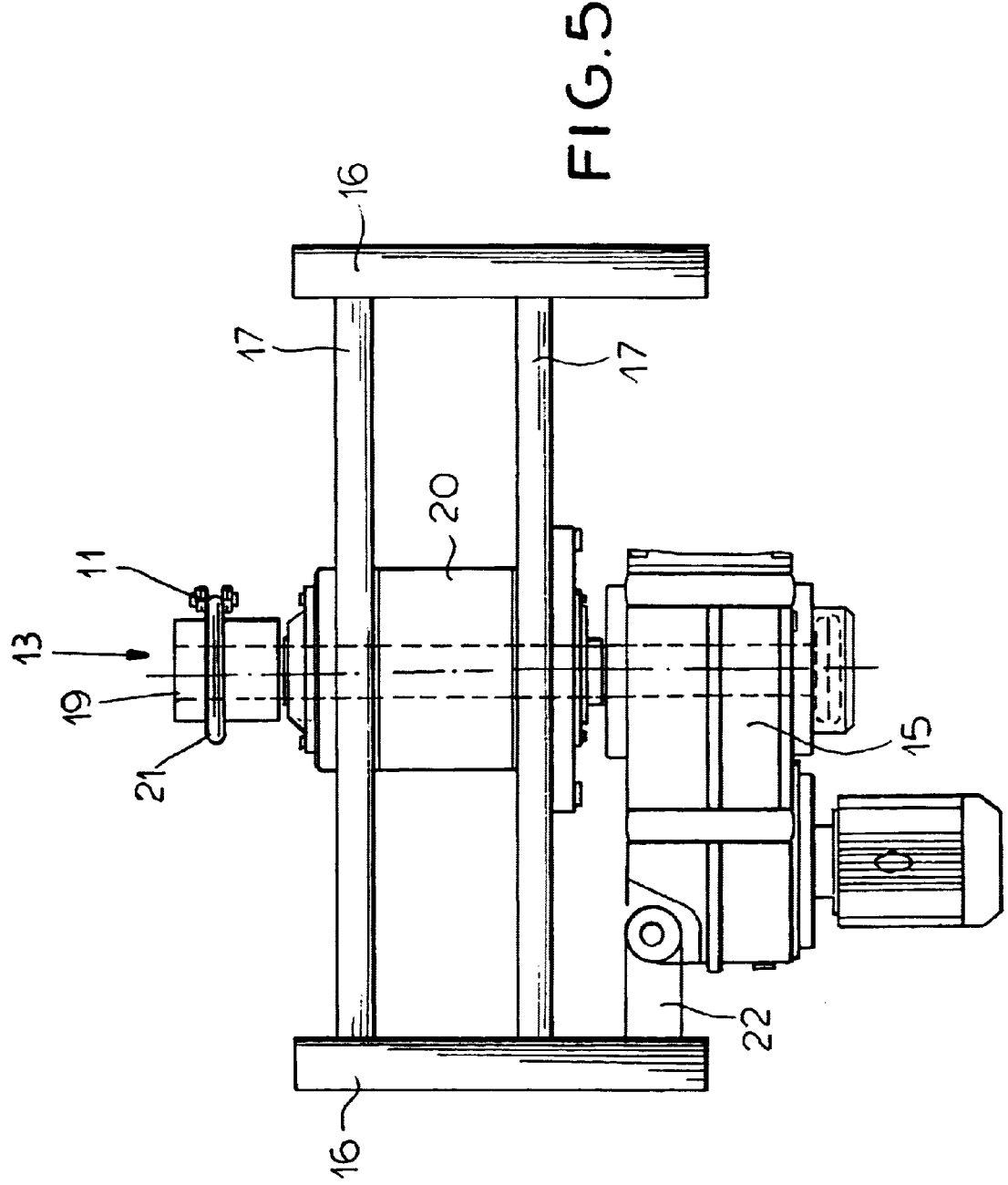
FIG. 5 shows a frame for an input-side drive seen from above.

The frame 13 is arranged in the transport direction downstream of the dryer 1 and serves for holding the drive 15. The frame 13 is on the drive side next to the start of the unloader 46. The drive 15 on the output side of the dryer 1 is shown in FIG. 5. The frame 13 is comprised of four rectangularly elongated thick plates 16 and 17 that are welded together in a box having a lower end provided with a fixed floor plate 18. The plates 16 extend perpendicular to the transport direction. The plates 17 extend between the two plates 16 to form a rectangle, with the plates 16 projecting past the corners of the rectangle.

The plates 17 are each formed with a vertical row of circular cutouts at heights between the levels for holding the drive shafts 19 in respective bearing housings 20. The bearing housings 20 are mounted with play in the respective cutouts and are screwed to the plate 17 remote from the dryer 1. The end of each drive shaft 19 toward the roller conveyor is level with and carries the respective sprocket 21 for driving the respective chain 11. The chain 11 thus is looped through 180° around this sprocket 21. On the other end of the drive shaft 19 is the drive 15, e.g. a drive motor. The drive 15 is fixed against rotating around the drive shaft 19 by, for instance, screwing to a torque brace 22 that is fixed to one of the plates 16.

Figure 6:
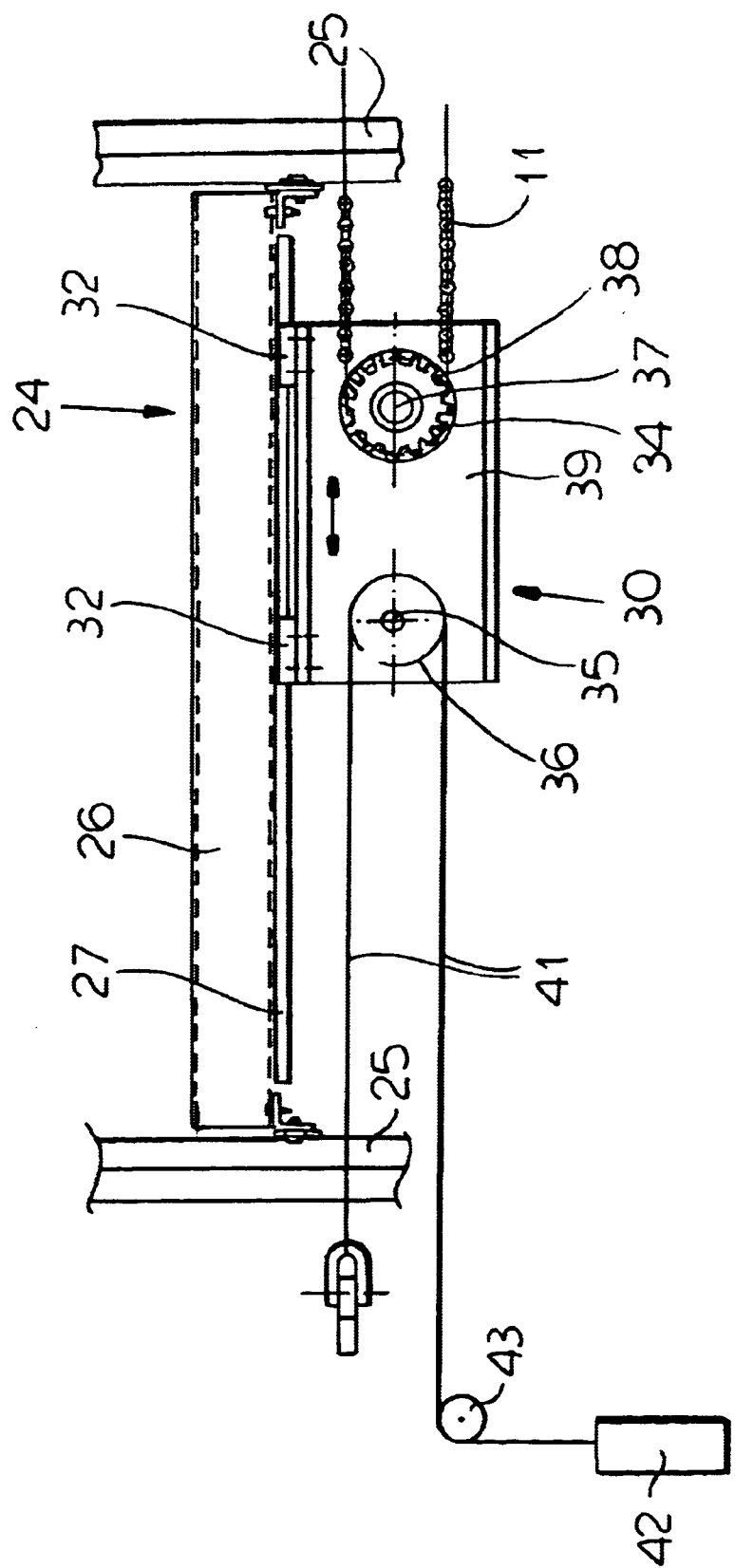
FIG. 6 shows a tensioning device from the side with the drive removed.
Figure 7:
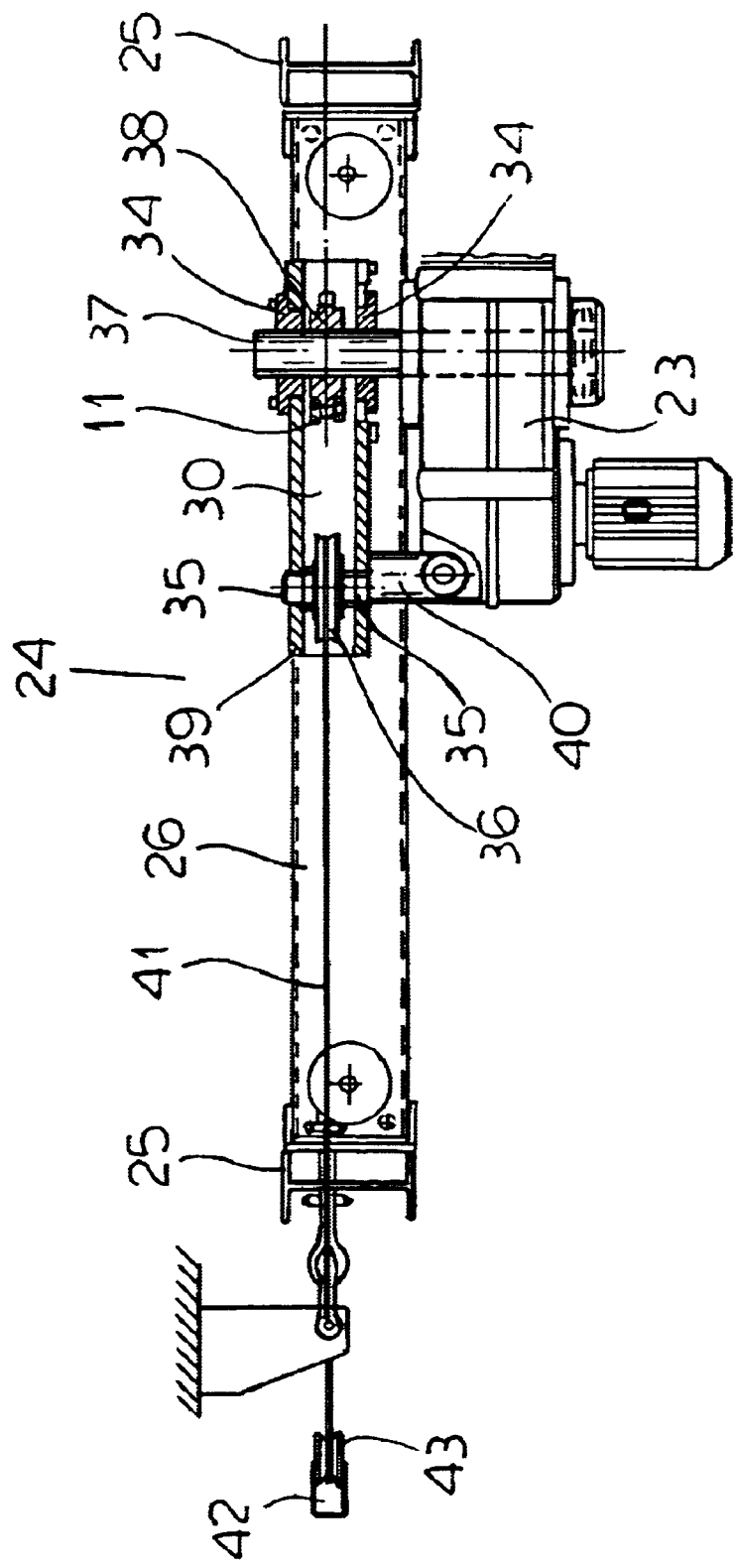
FIG. 7 shows the tensioning device of FIG. 6 but with the drive and seen partly in section from below.
Figure 8:
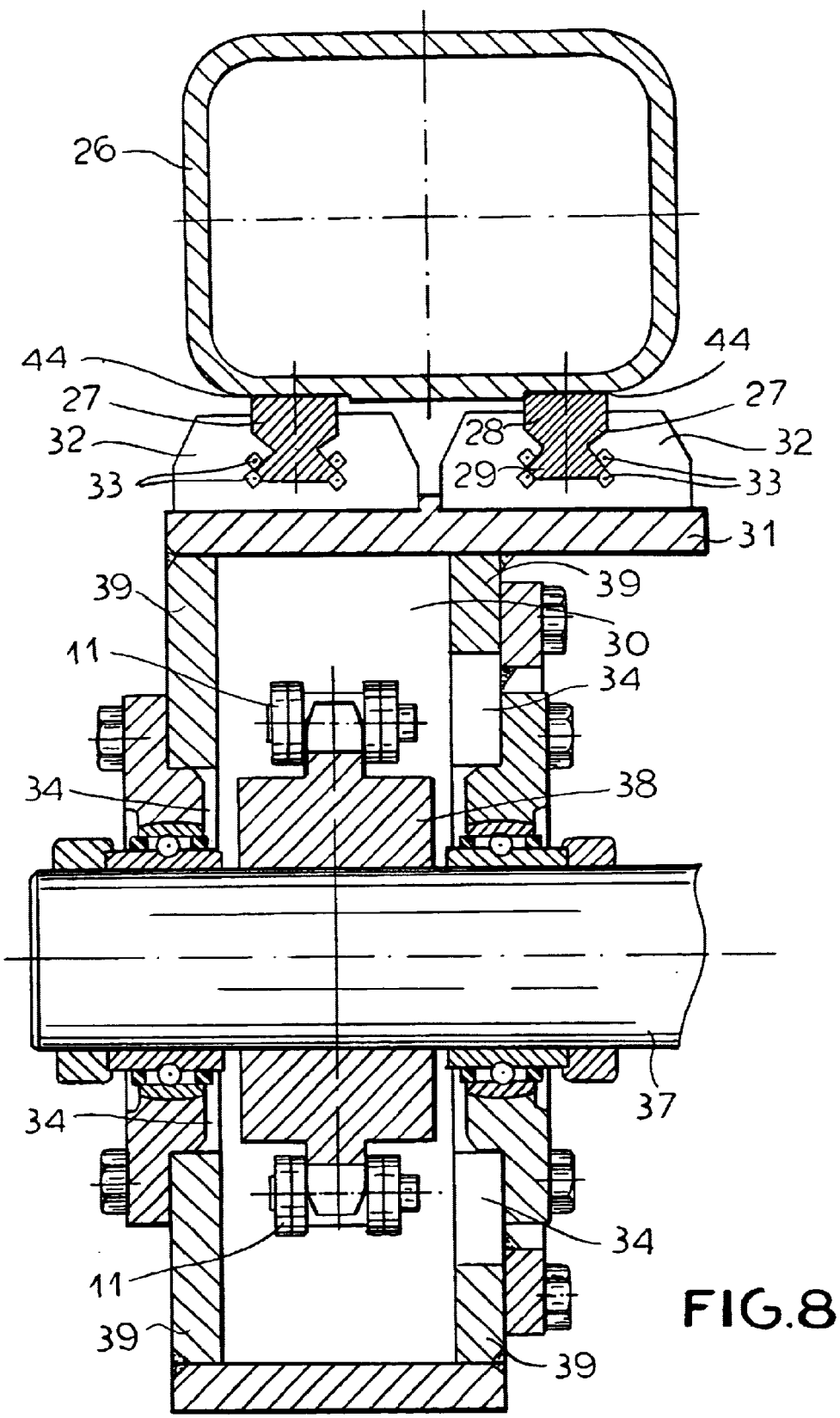
FIG. 8 is a slide-rail system in detail.

FIGS. 6 to 8 show the frame 14. The frame 14 is upstream of the dryer 1 and serves to hold second drives 23 combined with tensioning devices 24 for the chains 11. The frame 14 is on the drive side laterally adjacent the outlet of the feeder 45.

Two posts 25 spaced apart parallel to the transport direction are anchored in footings. Beams 26 extend between the posts 25. The number of beams 26 corresponds to the number of chains 11 of a dryer.

One beam 26 has for example a box section and is fixed on the respective two posts 25, e.g. by means of angle brackets and screws. The underside of each beam 26 has two planar guide surfaces 44 in each of which is set a respective rail 27. The two rails 27 of each pair extend parallel over along the full length of the respective beam 26.

Each pair of rails 27 and respective guide elements 32 are formed as in a standard roller bearing. Each system can resist forces except parallel to the rail length axes and torques about any axis. The terms rail head and foot are independent of the position of the rail and are purely functional (guiding or supporting).

The profile of each rail 27 is generally formed as a rectangle and symmetrical to a vertical plane with two offset faces on two longitudinal sides. Each side near a rail head 29 as the shape of an equilateral triangle whose base lies on the rectangle and whose corner is at the rectangle's corner. The surfaces formed by the sides of this triangle are the guide surfaces on which the guide elements 32 are supported. The second faces near a rail foot 28 are of trapezoidal section having a nonparallel side in line with the respective sides of the rectangle and forming the support surface of the rail 27 on the guide face 44.

Underneath each beam 26 is a box-like slide 30 that is slidable on the respective rails 27. The slide 30 is for example formed of four thick welded-together plates with the plate forming a top wall 31 projecting over one or both of the side plates. This is particularly useful when the slide 30 is relatively narrow. In this way there is good force transmission and also place for the guide elements 32. Narrow construction of the slide 30 is significant also for an overall compact assembly.

Four guide elements 32 are provided on each top plate 31, in pairs spaced apart longitudinally. Each guide element 32 has a generally rectangular footprint and section. The bottom surface that is in contact with the top plate 31 is planar. Opposite to the bottom surface the guide element 32 is centrally formed with a cutout that closely conforms to the cross section of the respective rail 27, not having however the shape of the rail foot 29.

The surfaces of each guide element 32 that confront the guide surfaces of the respective rail 27 are provided with recessed rollers 33 that are rotatable about their longitudinal axes. The rollers 33 project from the respective surfaces and bear virtually without play on the guide surfaces of the rail heads 29 and thus form an easily sliding mount between the guide element 30 and the rail 27.

Side plates 39 of each slide 30 are each formed with two round holes 34 and 35, one in one of the side plates 39 and directly across from each other. The confronting holes 35 remote from the dryer 1 rotatably hold a reversing roller 36. The two holes 34 hold a drive shaft 37. The drive shaft 37 carries a sprocket 38 that is vertically level with the sprockets 10 of the respective rollers 8. The chain 11 is looped around the sprocket 38 and leads to and from the dryer 1. The drive shaft 37 has an outer end extending into the transmission of a drive 23. This is secured on its end opposite the drive shaft 37 in a torque brace 40 that is mounted outside the slide 30.

Various systems are usable for tensioning as for example pressurized cylinders or rotatable spindles. The system described below works with a counterweight.

A cable 41 is looped around the deflecting roller 36.

One end of the cable 41 is for example fixed on the post 25 remote from the dryer 1 while the other end of the cable 41 is connected to a weight 42. The cable 41 leads from the post 25 over the deflecting roller 36 and over another deflecting roller 43 such that the weight 42 at the end hangs free. The size of the weight 42 is such that it ensures the desired chain tension.

In use the rollers 8 are driven via the drives 15 and 23 and the chains 11. This moves panels through the dryer 1. The drives 15 and 23 have the same nominal capacity and are operated at the same angular speed so that each drive 15 and 23 exerts about half of the necessary drive force on each chain 11. This reduces the tension in the chain 11. Differences in tension in the chain 11, for example caused by stretching as a result of heating, are eliminated by the tensioning device 24 since the slides 30 move correspondingly along the rails 27 and the tension is maintained generally constant in the chains 11 by the weight 42.

What is claimed is:

1. An apparatus for drying panels, the apparatus comprising:
    a plurality of roller conveyors arranged in superposed levels and advancable for moving the panels longitudinally from an upstream end to a downstream end of the apparatus;
    means for circulating a drying medium through the apparatus;

a plurality of endless drive chains extending longitudinally between the ends along the levels and each coupled to at least one of the roller conveyors for advancing same;

respective means connected to the chains at one of the ends for tensioning the chains;

a plurality of drive means each including
- an upstream drive motor connected to at least one of the chains at the upstream end of the apparatus and
- a downstream drive motor connected to at least one of the chains at the downstream end of the apparatus for advancing the chains from the upstream end to the downstream end.

2. The panel-drying apparatus defined in claim 1 wherein each chain is coupled to two of the roller conveyors.

3. The panel-drying apparatus defined in claim 1 wherein the tensioning means are at the upstream end.

4. The panel-drying apparatus defined in claim 1, further comprising respective longitudinally displaceable slides at the one end carrying the tensioning means and the respective drive motors.

5. The panel-drying apparatus defined in claim 1, further comprising respective longitudinally displaceable slides at the one end carrying the tensioning means.

6. The panel-drying apparatus defined in claim 5 wherein the slides are pendent.

7. The panel-drying apparatus defined in claim 1 wherein each roller conveyor comprises a plurality of parallel rollers each having a sprocket engaged by the respective chain.

* * * * *